United States Patent [19]

Kirk, Jr.

[11] 4,276,569

[45] Jun. 30, 1981

[54] METHOD AND APPARATUS FOR PRODUCING A FACSIMILE GRAY SCALE

[75] Inventor: John H. Kirk, Jr., Orlando, Fla.

[73] Assignee: Exxon Research & Engineering Co., Florham Park, N.J.

[21] Appl. No.: 31,951

[22] Filed: Apr. 20, 1979

[51] Int. Cl.³ .......................... H04N 1/22; H04N 1/30; H04N 1/40
[52] U.S. Cl. .................................... 358/298; 358/300; 358/283
[58] Field of Search .............................. 358/296–300, 358/283, 284; 346/153

[56] References Cited

U.S. PATENT DOCUMENTS

| | | | |
|---|---|---|---|
| 3,626,496 | 12/1971 | McConnell | 358/283 X |
| 3,715,475 | 2/1973 | Prause et al. | 358/283 X |
| 3,739,084 | 6/1973 | Heinrich | 358/283 |
| 3,830,967 | 8/1974 | Long | 358/283 |
| 4,084,196 | 4/1978 | Tisue et al. | 358/283 |

OTHER PUBLICATIONS

Gray Scale to Psuedo Halftone Conversion, Mix., Jr. et al., IBM Technical Disclosure Bulletin, vol. 20, No. 1 Jun. 77.

Primary Examiner—B. Konick
Assistant Examiner—Aristotelis M. Psitos
Attorney, Agent, or Firm—Norman L. Norris

[57] ABSTRACT

A facsimile apparatus receives signals representing black, white and various gradations of gray. The apparatus generates a control signal having a magnitude varying with the gradation of gray from white to black corresponding to the gradations of gray at a remotely located document. A stylus for marking on a copy medium is driven by a stylus drive circuitry which generates a stylus drive signal in response to the control signal which is substantially linearly related to the control signal when the magnitude of the control signal is above and below a threshold and has a step change at the threshold.

9 Claims, 4 Drawing Figures

METHOD AND APPARATUS FOR PRODUCING A FACSIMILE GRAY SCALE

BACKGROUND OF THE INVENTION

This invention relates to a facsimile receiver, more particularly, to a facsimile receiver wherein marks are made on a copy medium by a stylus.

In a typical facsimile receiver, various gradations of gray corresponding to the same gradations of gray at another remotely located document are easily reproduced by varying the stylus drive voltage at the receiver in a more or less linear manner. As the stylus drive voltage increases, the darkness or level of gray increases towards black and vice versa. However, this result can only be achieved with certain types of copy media. For example, electronsensitive paper manufactured by such companies as Fitchburg/Litton Industries will respond to increases in stylus drive voltage so as to achieve the above-described gray scale. However, other types of facsimile copy media will not respond in the same manner. For example, aluminized paper such as "Fitchburg Time Print" aluminum paper will not behave in the same linear manner to produce the gray scale yet it is advantageous from an emission standpoint since the soot associated with this paper is not present, at least to the degree, with the "Time-Fax" paper.

SUMMARY OF THE INVENTION

It is an object of this invention to provide a facsimile receiving apparatus which is capable of achieving a gray scale on a copy media not heretofore recognized as permitting such a gray scale.

It is a further object of this invention to provide a facsimile receiving method and apparatus which achieves such a gray scale without undesirable emissions.

In accordance with these and other objects of the invention, a method and apparatus is provided wherein signals representing black, white and various gradations of gray in-between are received which generally correspond with the black, white and gradations of gray of a remotely located document. These gradations of gray are reproduced on a copy medium by a stylus which is driven by circuitry responsive to a control signal having a magnitude varying with the gradation of gray of the remotely located document.

In the preferred embodiment of the invention, a threshold is established and a stylus drive signal is generated which is substantially linearly related to the control signal when the magnitude of the control signal is above and below the threshold and has a step change at the threshold.

In a particularly preferred embodiment of the invention, the apparatus for generating the stylus drive signal comprises a comparator which detects the threshold level and produces an output signal having a step transition at the threshold. The apparatus further comprises summing means coupled to the comparator and the control signal for generating the stylus drive signal.

In the preferred embodiment of the invention, the copy medium comprises aluminized paper. The stylus drive circuitry produces on the copy medium a first range of voltages to produce white to increasingly gray marks on to a predetermined gray level and a second range of voltages to produce the predetermined gray level to increasingly darker gray on to black. The voltage in the first range producing the gray level differs substantially from the voltage in the second range producing the same predetermined level gray. In the preferred embodiment, the voltage in the first range and the voltage in the second range producing the same predetermined level of gray differs by at least 3 volts.

DETAILED DESCRIPTION OF A PREFERRED EMBODIMENT

Figure 1:
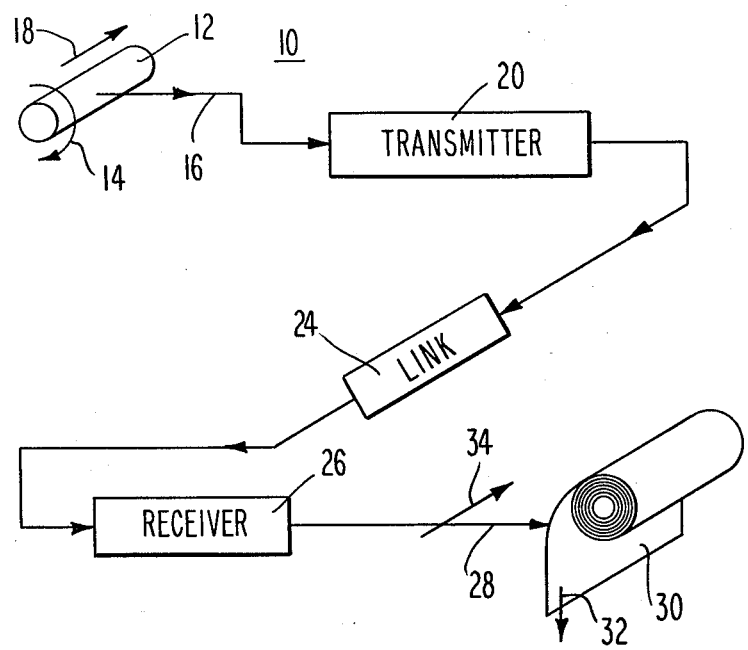
FIG. 1 is a block diagram of a facsimile system including a receiver which embodies the invention.

Referring to FIG. 1, a facsimile transmitter 10 comprises a drum 12 which rotates on a longitudinal axis in the direction indicated by an arrow 14 as an optical scanner schematically illustrated by an arrow 16 moves in a linear scanning direction depicted by an arrow 18. The optical scanner 16 which may include a suitable photodetector is coupled to a transmitter circuit 20 which includes suitable amplification and modulating circuitry to produce facsimile signals representing the dark/light variations of a document carried by the drum 12.

The transmitter circuitry 20 is coupled to a remotely located receiver 22 through a suitable communications link 24 such as a telephone line. The receiver 22 includes suitable amplification and demodulation circuitry and stylus drive circuitry for generating a stylus drive signal in accordance with this invention which is coupled to a stylus depicted by an arrow 28. The stylus 28 reproduces the dark/light variations of the document at the transmitter 10 on a copy medium 30. As shown in FIG. 1, the copy medium 30 comprises a continuous roll of copy paper which is adapted to move in the direction indicated by arrow 32 as the stylus 28 linearly scans the copy medium 30 in a direction indicated by an arrow 34. Further details concerning stylus 28 and the scanning motion of the stylus 28 relative to the roll of copy medium 30 may be found in copending application Ser. No. 31,949 filed Apr. 20, 1979 which is incorporated herein by reference as if set forth in full.

Figure 2:
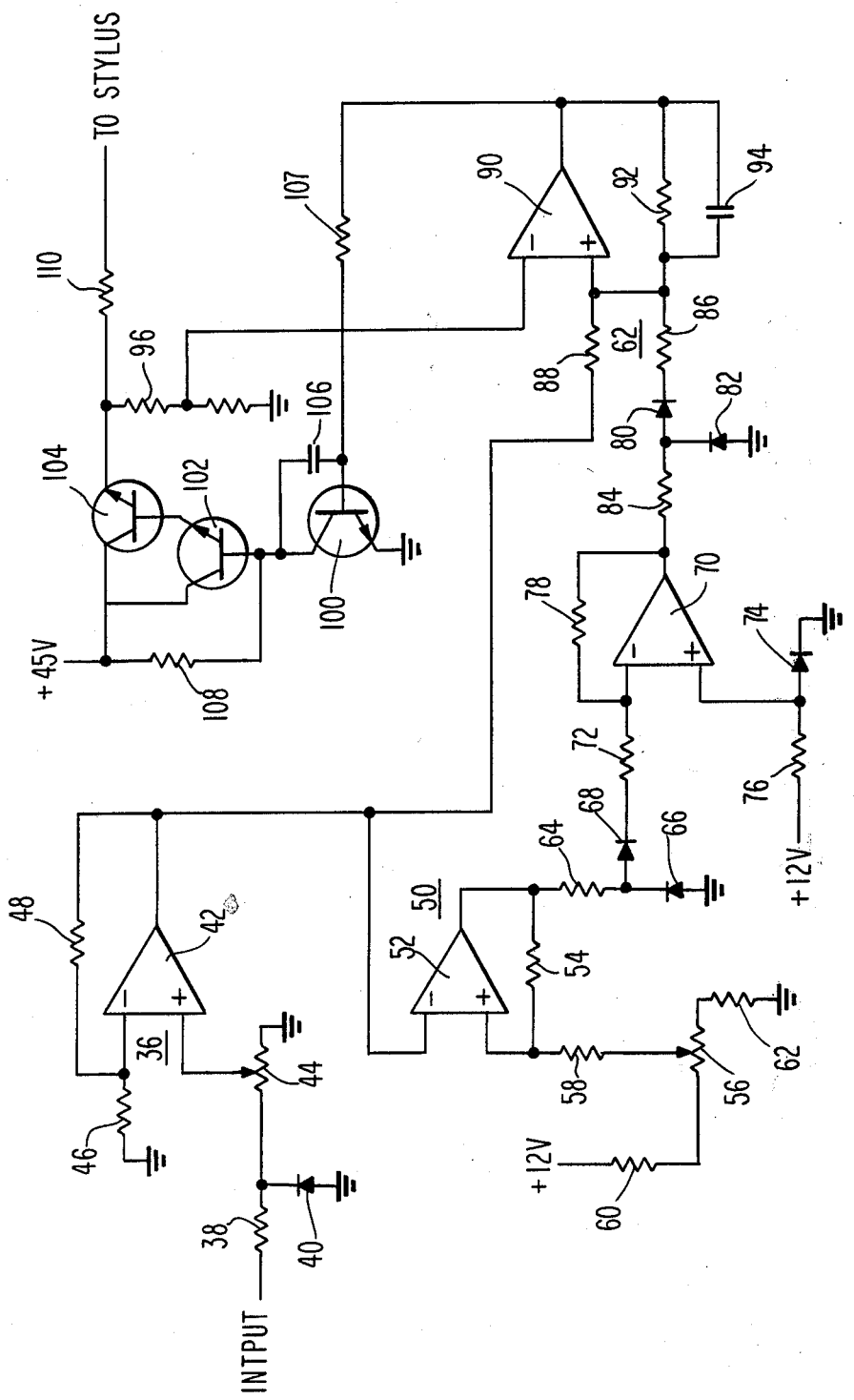
FIG. 2 is a circuit diagram of the preferred embodiment of the invention.

Reference will now be made to FIG. 2 for a discussion of the stylus drive circuitry which is incorporated in the receiver circuit 26 of FIG. 1.

A stylus control signal is produced after suitable demodulation and amplification and applied to an amplifier circuit 36 through a resistor 38 which is connected to ground through a diode 40. The amplifier 36 includes operational amplifier 42 having an inverting and non-inverting terminals. The stylus control signal at the junction of the resistor 38 and the diode 40 is connected to the non-inverting terminal through a contrast control potentiometer 44. The inverting terminal of the amplifier 42 is connected to a resistor 46 and a gain determining feedback resistor 48.

In accordance with this invention, the amplified stylus control signal is supplied to a comparator 50 which establishes a predetermined threshold for use in generating a step change in the stylus drive voltage. The comparator 50 includes an operational amplifier 52 with a feedback resistor 54 and an inverting terminal connected to the output of the amplifier 42. The non-inverting terminal is connected to a threshold determining potentiometer 56 through a resistor 58. The poentiometer 56 is connected to +12 volt power supply through a resistor 60 and to ground through a resistor 62.

In accordance with this invention, the threshold established by the potentiometer 56 in connection with the operational amplifier 52 is properly chosen so that the stylus drive signal will ultimately produce marks on the copy medium ranging from white to gray below the threshold and further will produce marks from that particular gray level to black when the control signal is above the threshold. This is achieved by generating a step increase in the voltage which is applied to a summing network 62 along with the stylus control signal.

As shown in FIG. 2, the output from the comparator 50 is dropped across a resistor 64 and clamped by a diode 66. The voltage at the junction between the diode 66 and the resistor 64 is then dropped across a diode 68. The output from the diode 68 is connected to an inverting terminal of an operational amplifier 70 through a resistor 72. The non-inverting terminal of the operational amplifier 70 is connected to the junction of a diode 74 and a resistor 76 connected to a +12 volt power supply so as to supply a reference voltage to the non-inverting terminal. With the feedback resistor 78 properly chosen, the gain of the operational amplifier 70 may be established at the desired level. The output from the operational amplifier is connected to a diode 80 through a resistor 84 which is connected to ground through a diode 82. The diode 80 is connected to a resistor 86 which is in turn connected to the summing junction of the summing network along with a resistor 88 connected to the output of the operational amplifier 42.

The summing network 62 also includes an operational amplifier 90 which has an inverting terminal connected to the junction of the summing resistors 86 and 88. The operational amplifier 90 employs an RC feedback circuit including a resistor 92 and a capacitor 94. In order to maintain the stylus drive voltage constant with varying load, a portion of the stylus drive voltage is fed back to the non-inverting terminal of the operational amplifier through resistors 96 and 98.

The output of the operational amplifier 90 is buffered by transistor 100 connected to transistors 102 and 104 which are connected in a darlington configuration so as to provide a high voltage drive to the stylus. A capacitor 106 is connected between the base of the transistor 100 and its collector, and a resistor 107 connects the base of the transistor 100 to the output of the operational amplifier 90. A bias resistor 108 connects the collector of the transistor 100 to a +45 volt power supply which is also connected to the collectors of the darlington transistors 102 and 104. The output from the emitter of the transistor 104 is then connected to the stylus through a resistor 110.

In accordance with this invention, a stylus control signal which is applied to summing resistor 88 will be summed with one of two stepped voltages. In the preferred embodiment, the step voltages are 0 volts when the stylus control signal is below the predetermined threshold level as established by the comparator 50 or 3.29 volts when the stylus control signal is above that threshold level as will now be described in detail.

Below the predetermined threshold level, the output of the comparator 50 is at about +10 volts. This reverse biases the diode 66 and forward biases the diode 68 which forces the output of the operational amplifier 70 to be about −10 volts. This output is clamped to −0.7 volts by the diode 82 which is forward biased. The diode 80 provides a 0.7 volt drop which puts 0 volts at the summing resistor 86.

When the stylus control voltage is above the threshold level, the output of the comparator 50 is about −10 volts which is clamped to −0.7 volts by the diode 66. This voltage is then dropped by the diode 68 so that the resistor 72 is at 0 volts. The operational amplifier 70 now serves as an amplifier with a gain of 3.35. The resistor 76 is now 3.99 volts which forward biases the diode 80. With the drop across the diode 80 of 0.7 volts, this puts 3.29 volts at the summing resistor 86. The summing resistors 88 and 86 in conjunction with the operational amplifier 90 therefore sum the stylus control signal with either 0 volts when the input is below the threshold level or 3.29 volts when the input is above the threshold level.

From the foregoing, it should be appreciated that the stylus drive voltage is substantially linearly related to the stylus control when the magnitude of the control signal is above and below the threshold determined by the comparator 50 and undergoes a step change at that threshold. This step change in the stylus drive voltage may perhaps best be appreciated by reference to FIG. 3 wherein the grayness produced on the copy medium as a result of stylus drive voltage is plotted on the ordinate against the voltage on the abscissa. Any stylus drive voltage in the range "a" which will produce a mark from white to gray depending upon the magnitude of the stylus drive voltage. Similarly, a stylus drive voltage in a range "b" which will produce marks on the copy medium of gray to black. It will be appreciated that there is a step increase in the stylus drive voltage so as to substantially preclude any voltage in the range "c" between the ranges "a" and "b".

Figure 3:
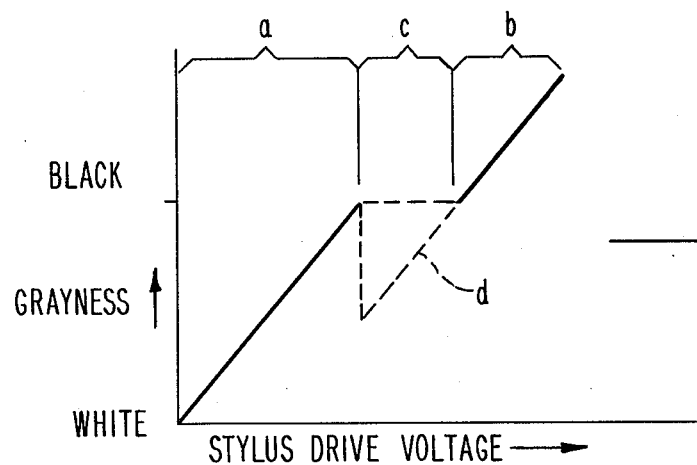
FIG. 3 is a line drawing representing the relationship of stylus drive voltage to the level of gray.

It will be noted by reference to FIG. 3, that the highest voltage which produces the darkest gray in the range "a" is substantially different from and less than the lowest voltage in the range "b" which produces the lightest gray in that range. When aluminized paper is utilized, the difference in voltage may be 3 to 4 volts, preferably 3.3 volts. However, to optimize the gray scale, it is important to provide an appropriate step increase in voltage such that the darkest gray produced by highest voltage in range "a" is substantially the same as the lightest gray produced by the lowest voltage in range "b". It will also be noted that the degree of grayness produced by the voltages in range "a" is substantially linearly related to the voltages in range "a". Similarly, the degree of grayness produced by the voltages in range "b" is substantially linear related to those voltages although the linear relationship between ranges "a" and "b" may differ as shown in FIG. 3.

With reference to FIG. 3, it will be appreciated that the voltage is stepped from the highest voltage in range "a" to the lowest voltage in range "b" and the intermediate voltages in range "c" represented by the dotted line are not achieved by the circuit of FIG. 2. However, if that stwere not achieved, the gray levels generated by the continuous change of voltage would be as depicted in the dotted line "d" for the voltages within range "c".

Figure 4:
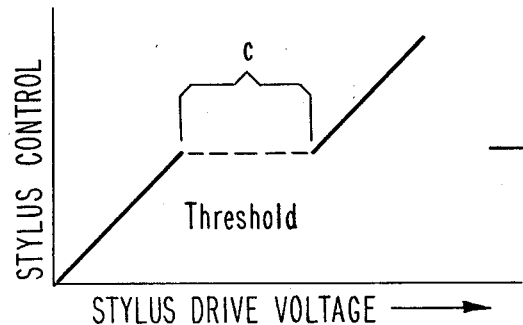
FIG. 4 is a line drawing representing the relationship between a stylus control signal and the stylus drive voltage.

FIG. 4 depicts the relationship between the stylus control signal and the stylus drive voltage. As shown there, it should be clear that the stylus drive voltage is stepped at the threshold while the stylus control signal increases in magnitude so as to preclude voltages in the range "c".

Although a particular embodiment of the invention has been shown and described in detail, it will be understood that other embodiments and modifications will fall within the true spirit and scope of the invention as set forth in the appended claims.

What is claimed is:

1. A facsimile apparatus for receiving signals representing black, white and various gradations of gray therebetween, said apparatus including:
   stylus means adapted to mark on a copy medium;
   means for generating a control signal having a magnitude varying as said signals vary with the gradation of gray from white to black with a remotely located document; and
   improved stylus drive circuitry including
      means for establishing a threshold level; and
      means for generating a stylus drive signal substantially linearly related to said control signal when the magnitude of said control signal is above and below said threshold and having a step change at said threshold.

2. The facsimile apparatus of claim 1 wherein said stylus drive signal below said threshold produces marks on said copy medium ranging from white to gray and said stylus drive signal above said threshold produces marks on said copy medium ranging from gray to black.

3. The facsimile apparatus of claim 2 further comprising a copy medium including aluminized paper.

4. The facsimile apparatus of claim 1 wherein said threshold means comprises a threshold signal source and a comparator for comparing said control signal with said threshold signal and producing an output signal having a step transition at the threshold.

5. The apparatus of claim 4 wherein said stylus drive circuitry comprises summing means coupled to said threshold means and said control signal generating means for generating said stylus drive signal.

6. A method of generating a gray scale on a copy medium comprising aluminized paper by juxtaposition with a stylus including the following steps:
   driving said stylus with a first range of voltages to produce white to increasingly gray marks on said copy medium;
   driving said stylus with a second range of voltages to produce increasingly gray to black marks on said copy medium; and
   the voltage in said first range producing the darkest gray differing substantially in magnitude from the voltage in said second range producing the lightest gray of said second range.

7. The method of claim 6 wherein the closest voltages in said first range and said second range differ by more than 3 volts.

8. The method of claim 6 wherein said darkest gray in said first range is substantially the same degree of gray as said lightest gray in said second range.

9. The method of claim 6 wherein the voltages in said first range are substantially linearly related to the grayness produced by said voltages in said first range and the voltages in said second range are substantially linear related to the grayness produced by said voltages in said second range.

* * * * *